US012748873B2

(12) United States Patent
Bonat

(10) Patent No.: US 12,748,873 B2
(45) Date of Patent: Sep. 29, 2026

(54) SYSTEMS AND METHODS FOR DATA CLASSIFICATION AND GOVERNANCE

(71) Applicant: JPMORGAN CHASE BANK, N.A., New York, NY (US)

(72) Inventor: Michelle Bonat, Half Moon Bay, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 107 days.

(21) Appl. No.: 18/298,910

(22) Filed: Apr. 11, 2023

(65) Prior Publication Data

US 2023/0359754 A1 Nov. 9, 2023

Related U.S. Application Data

(60) Provisional application No. 63/364,103, filed on May 3, 2022.

(51) Int. Cl.
*G06F 21/62* (2013.01)
*G06F 21/60* (2013.01)

(52) U.S. Cl.
CPC ........ *G06F 21/6218* (2013.01); *G06F 21/604* (2013.01); *G06F 2221/2101* (2013.01); *G06F 2221/2141* (2013.01)

(58) Field of Classification Search
CPC ............... G06F 21/604; G06F 21/6218; G06F 2221/2101; G06F 2221/2141
See application file for complete search history.

(56) References Cited

U.S. PATENT DOCUMENTS

| | | | | |
|---|---|---|---|---|
| 8,839,344 | B2 * | 9/2014 | Becker | G06F 21/552 726/4 |
| 8,973,108 | B1 * | 3/2015 | Roth | G06F 21/00 726/28 |
| 10,073,791 | B2 * | 9/2018 | Linga | G06F 16/93 |
| 10,491,635 | B2 * | 11/2019 | Arumugam | G06F 16/182 |
| 11,393,046 | B1 * | 7/2022 | McCluskey | G06F 21/6227 |
| 12,045,843 | B2 * | 7/2024 | Bonat | G06F 21/6245 |
| 2015/0026759 | A1 * | 1/2015 | Krisna | G06F 21/53 726/1 |
| 2018/0204022 | A1 * | 7/2018 | Panchbudhe | G06F 21/604 |
| 2020/0014702 | A1 * | 1/2020 | Dasgupta | G06F 21/45 |
| 2021/0406381 | A1 * | 12/2021 | Heisrath | H04L 63/123 |
| 2022/0075801 | A1 * | 3/2022 | Chai | G06F 16/285 |
| 2022/0114603 | A1 * | 4/2022 | Bonat | G06F 21/6245 |
| 2022/0210079 | A1 * | 6/2022 | Koren | H04L 41/14 |
| 2022/0303313 | A1 * | 9/2022 | Gargaro | H04L 63/1425 |

(Continued)

*Primary Examiner* — Gary S Gracia
(74) *Attorney, Agent, or Firm* — GREENBERG TRAURIG LLP

(57) ABSTRACT

Systems and methods for data classification and governance are disclosed. In accordance with aspects, a method may include retrieving data related to a first-level entity, wherein the first-level entity is associated with a governance policy; using one or more machine learning models, a method may include: adding labels to the data; adding classifications to the data based on the labels; generating nodes and edges in a graph based on the governance policy and known user interactions with the data; resolving ambiguous nodes into specific nodes; predicting edge probabilities in the graph; and predict a flow of data in a network based on the edge probabilities.

17 Claims, 3 Drawing Sheets

(56) References Cited

U.S. PATENT DOCUMENTS

| | | | | |
|---|---|---|---|---|
| 2023/0214754 | A1* | 7/2023 | Eidelman | G06Q 10/06375 705/7.37 |
| 2023/0283561 | A1* | 9/2023 | Koren | H04L 41/16 370/252 |
| 2023/0297927 | A1* | 9/2023 | Jagadeesan | G06F 16/31 705/7.42 |
| 2023/0359754 | A1* | 11/2023 | Bonat | G06F 21/604 |

* cited by examiner

SYSTEMS AND METHODS FOR DATA CLASSIFICATION AND GOVERNANCE

RELATED APPLICATIONS

This application claims priority to, and the benefit of, U.S. Provisional Patent Application No. 63/364,103, filed May 3, 2022, the disclosure of which is hereby incorporated, by reference, in its entirety.

BACKGROUND

1. Field of the Invention

Aspects are generally related to systems and methods for classification and governance of sensitive data using artificial intelligence (AI) and/or machine learning (ML) techniques.

2. Description of the Related Art

There are presently few options for classifying, at scale, data that contain sensitive elements (e.g., personal information (PI) or highly confidential data (HCD)). Classification of such data is generally manually performed. When operating at a very large scale, however, a manual approach to classification will likely not be a practical option. Further, classifying sensitive data and subsequently mechanically masking the classified sensitive data by, e.g., column, row, source, or type, results in a loss of value, since the classified data is not easily readable.

Additionally, sensitive data must be governed. Only certain roles in an organization may be permitted to access certain types (or levels or classifications) of data, and those permissions may depend on where that data is sourced and how it is being used. Governing the usage of sensitive data adds complexity because the data may have been used and then stored in a derived form that is downstream from the initial access point (e.g., on an employee's laptop).

SUMMARY

In some aspects, the techniques described herein relate to a method for data classification and governance, including: retrieving data related to a first-level entity, wherein the first-level entity is associated with a governance policy; processing the data with one or more machine learning models, wherein the processing includes: adding labels to the data; adding classifications to the data based on the labels; generating nodes and edges in a graph based on the governance policy and known user interactions with the data; resolving ambiguous nodes into specific nodes; predicting edge probabilities in the graph; and predicting a flow of data through the graph based on the edge probabilities.

In some aspects, the techniques described herein relate to a method, wherein the graph is refined with new edge-to-node connections based on discovered relationships.

In some aspects, the techniques described herein relate to a method, including: inserting a data probe at an entity in the graph; and monitoring injected data from the data probe into the graph as the injected data traverses the graph.

In some aspects, the techniques described herein relate to a method, including: updating the graph based on a traverse path of the injected data.

In some aspects, the techniques described herein relate to a method, wherein the updating includes adding edges to the graph.

In some aspects, the techniques described herein relate to a method, wherein the updating includes adding nodes to the graph.

In some aspects, the techniques described herein relate to a method, including: generating an action with respect to an end user based on the flow of data through the graph.

In some aspects, the techniques described herein relate to a system for data classification and governance including at least one computer including a processor, wherein the processor is configured to: retrieve data related to a first-level entity, wherein the first-level entity is associated with a governance policy; process the data with one or more machine learning models, wherein the one or more machine learning models are configured to: add labels to the data; add classifications to the data based on the labels; generate nodes and edges in a graph based on the governance policy and known user interactions with the data; resolve ambiguous nodes into specific nodes; predict edge probabilities in the graph; and predict a flow of data through the graph based on the edge probabilities.

In some aspects, the techniques described herein relate to a system, wherein the graph is refined with new edge-to-node connections based on discovered relationships.

In some aspects, the techniques described herein relate to a system, wherein the processor is configured to: insert a data probe at an entity in the graph; and monitor injected data from the data probe into the graph as the injected data traverses the graph.

In some aspects, the techniques described herein relate to a system, wherein the processor is configured to: update the graph based on a traverse path of the injected data.

In some aspects, the techniques described herein relate to a system, wherein the update includes adding edges to the graph.

In some aspects, the techniques described herein relate to a system, wherein the update includes adding nodes to the graph.

In some aspects, the techniques described herein relate to a system, wherein the processor is configured to: generate an action with respect to an end user based on the flow of data through the graph.

In some aspects, the techniques described herein relate to a non-transitory computer readable storage medium, including instructions stored thereon for data classification and governance, which instructions, when read and executed by one or more computer processors, cause the one or more computer processors to perform steps including: retrieving data related to a first-level entity, wherein the first-level entity is associated with a governance policy; processing the data with one or more machine learning models, wherein the processing includes: adding labels to the data; adding classifications to the data based on the labels; generating nodes and edges in a graph based on the governance policy and known user interactions with the data; resolving ambiguous nodes into specific nodes; predicting edge probabilities in the graph; and predicting a flow of data through the graph based on the edge probabilities.

In some aspects, the techniques described herein relate to a non-transitory computer readable storage medium, wherein the graph is refined with new edge-to-node connections based on discovered relationships.

In some aspects, the techniques described herein relate to a non-transitory computer readable storage medium, including: inserting a data probe at an entity in the graph; and monitoring injected data from the data probe into the graph as the injected data traverses the graph.

In some aspects, the techniques described herein relate to a non-transitory computer readable storage medium, including: updating the graph based on a traverse path of the injected data.

In some aspects, the techniques described herein relate to a non-transitory computer readable storage medium, wherein the updating includes adding edges to the graph and adding nodes to the graph.

In some aspects, the techniques described herein relate to a non-transitory computer readable storage medium, including: generating an action with respect to an end user based on the flow of data through the graph.

DETAILED DESCRIPTION

Figure 1:
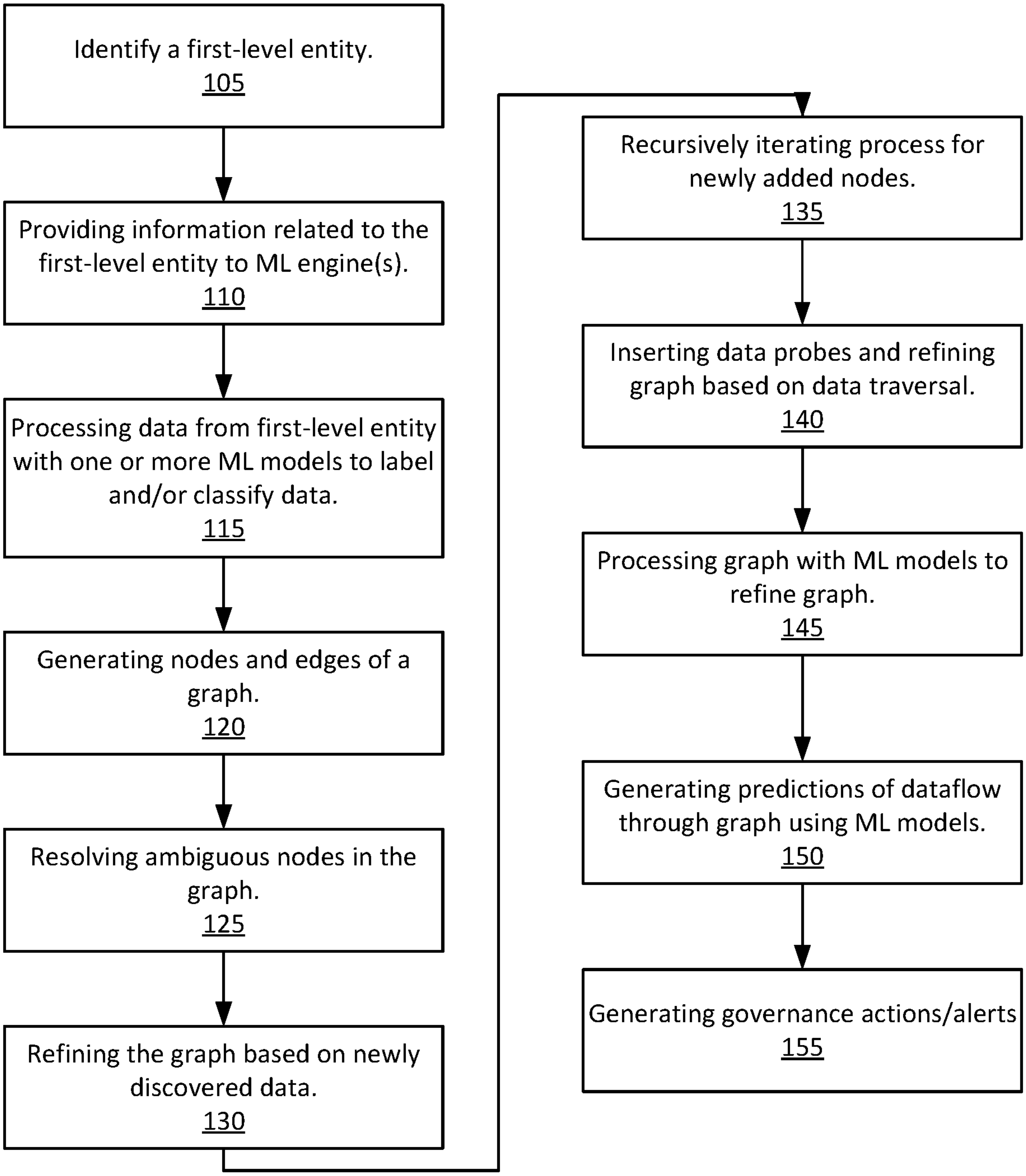
FIG. 1 is a logical flow for building and refining a data sharing graph, in accordance with aspects.

Aspects are generally related to systems and methods for classification and governance of sensitive data using artificial intelligence (AI) and/or machine learning (ML) techniques.

In accordance with aspects, data graphs and data science techniques, e.g., in the form of graph neural networks can be used to replace simple manual classification or mechanical masking. An approach may use AI-ML to incorporate a learning data classifier prediction tool, and graph neural networks with built in governance capabilities.

Aspects described herein can enhance data classification beyond identification and masking of sensitive data. Disclosed techniques may identify and assign classification predictions to sensitive data. User access to data may then be controlled based on a programmatic determination of governance policies. For example, a specific record class code may be programmatically identified and assigned to a user or a user group. Additionally, aspects may provide for assignment of a PI or HCD indicator or flag, or a data field indicator for a data field that stores data that, e.g., is covered/designated under a regulatory scheme (such as the California Consumer Privacy Act (CCPA) or the California Privacy Rights Act (CPRA). Moreover, a sensitive data indicator may be assigned to a data set down at the cell level. A near-zero touch control pattern may minimize manual input and allow the system to scale.

Systems and methods disclosed herein include techniques for building a data sharing graph and/or network that has a capacity to learn and dynamically update relevant relationships and insights, and generate alerts based on changing information.

Sensitive data include specific and often personal information. Further, there may be regulatory or other legal protections afforded to sensitive data. Examples of sensitive data may include gender, race, religion, age and other personal or protected classes of data. Other demographic or personal data may be classified as sensitive according to an organization's governance policies as necessary or desired. Conventionally, sensitive data has been stored together with other types of data in relational database management systems (RDMBS). As the amount of data has become larger, the RDBMS systems have also grown to accommodate the growth. However, the way RDBMS are constructed—with deep hierarchies and top down or lateral connections—results in code that can be expensive to build, slow to run, and difficult to maintain. Such tabular data and rigid schemas make the addition of new relations between the stored data difficult or impossible, particularly without rigid "hard coding" of relationships. Moreover, as the data set grows, conventional queries against it become ever slower. This environment makes it increasingly difficult to generate insights from, and properly govern the use of data in expanding data pools.

In accordance with aspects, using graph databases provides the ability to store data in a manner that is conducive to understanding the relationships between data points. Graph databases flexibly adapt to new data models and relationships and maintain such flexibility as a data set grows. Once data is connected using a graph database, the relationships between the data can be quickly and intuitively understood. Using data science on top of a graph database layer can enhance and streamline data discovery, exploration, and predictions based on the data set.

A data sharing network graph for data classification and governance may be constructed by leveraging numerous data sources. Data sources may include an organization's internal databases; reports that track which employees queried and accessed which data; HR employee hierarchies that indicate the managers of accessing employees and the managers' and employees' various lines of business; and other relevant asserts as is necessary or desired. Data from such data sources may be used to build a "data map" or "graph" of the data sharing network. Nodes in the graph may represent entities (e.g., databases, employees, managers, etc.), and edges in the graph may represent data sharing relationships. Exemplary edges may be as general as "sharing," or as specific as "sharing web browsing click trails from an internal marketplace."

A data map or graph may also be generated based on inputs that may include real-world relationships and data flows. This data may be generated and/or processed using machine learning (ML) models, such as Graph Neural Network (GNN) models, or using more traditional methods. A GNN, as used herein, is an artificial neural network for processing data that can be represented as a graph. A GNN may include a machine learning algorithm that, when exposed to a training data set, produces a machine learning model for generating predictions with respect to data input to the model. The model may include model data and a prediction algorithm.

Once built, a data graph may be validated and modified by inserting data probes comprising data (e.g., synthetic data) at different points of the GNN (i.e., with respect to a specific organization) and monitoring other graph nodes for receipt of the data injected via the data probe. This validation through using data probes may be carried out using real-world interactions.

In other aspects, real-world data can be tracked as it progresses through, and is accessed by people in, an organization. A data graph corresponding to the organization's people and resources can then be updated/validated with the observed real-world data traversal. For example, tracking may start with activity paths created from internal employees in an internal data marketplace, then from an organization's data request processes, and eventually onto a database where data is accessed, and ultimately, e.g., noting if the data is downloaded onto a local computer. Based on the data progression, the GNN may be verified and/or modified/(re) trained as is necessary.

Each node in the GNN may be associated with one or more prediction metrics. A prediction metric predicts whether data inserted at a specific node will reach the node associated with the prediction metric. The prediction metric may further be based on a timing of the submission, a nature of the submission, a licensing requirement from external data providers (which may cover certain but not all of the data), etc. For example, edges of the graph may contain metadata about the predictive likelihood that data may traverse that path and nodes may contain metadata about what data are desired, retained, and deleted. This metadata may be obtained from the data governance policy of the firm or other data sources such as their contracts in the case of externally sourced data.

The GNN may then be traversed to determine likely sources of data policy violations, as well as any inappropriately authorized employees and systems that should be alerted to remove that data from their stored repositories.

Although the term "GNN" is used here, other types of graphs and networks, such as Graph Learning Networks (GLN) that may be generated using Graph Machine Learning (GML), and other suitable graphs or networks, may be used as is necessary or desired.

FIG. 1 is a logical flow for building a data sharing graph or network, in accordance with aspects. At step 105, a user (e.g., an employee of an organization) identifies where the process should begin, i.e., a "first-level entity" that collects data directly from a system or user. Examples of such first-level entities include internal databases, specific datasets that reside in a stored location, internal web sites, apps, etc. An initial list may be created based on, for example, user browser history, network monitoring of web traffic, explicit user input, monitoring application installations, etc. This step may be automated in some aspects.

At step 110, the system retrieves the information related to the first-level entity including user activity such as tracking cookies, internal monitoring systems, download reports, etc. Each first-level entity may be associated with a governance policy. Governance policies may be stored centrally within a firm and can be programmatically accessed. For example, there may be a governance policy for each source (e.g., from a certain external supplier), another policy for a location (e.g., an internal database where the data is stored), another policy for a logical dataset (e.g., how that specific dataset may be used), another policy based on a human resources (HR) hierarchy, a policy based on a line of business, etc.

At step 115, the data may be processed into a useable format. This may include different ML classifiers for different jobs, and for different types of data. For instance, textual data may use a natural language processor (NLP) model. An exemplary set of ML classifiers may take the form of a multi-label, multi-class, hierarchical, conditional set of models. That is, an exemplary set of ML models for processing discovered data may include ML models that first add appropriate labels (labeling models), then successive processing by ML models that add classifications (classification models) specifically related to the choices associated with assigned labels.

Classification models may be based on conditionalities that depend upon predefined logic. For instance, given a first-level entity of a certain internal platform, the type of data stored at the entity will be known. Logic may be employed to serve models that are appropriate for those particular critical data elements stored at the first-level entity. Accordingly, given that a particular entity, e.g., a first database, stores types of critical data elements that are categorized as belonging to a first category (e.g., category A), then category A models may be employed to label the occurrences of these elements in category A. Subsequently follow-on models may then be employed to add classification labels in category A. An exemplary aspect may include assigning a category type: "Age/Birth Date", and then assigning the classification label as "Applicant Birth Date". The category and label predictions may be delivered with a confidence level setting. For example, a model may be set to automatically assign a label type when it is predicted at greater than 90% confidence of that label, and then automatically assign a classification when that label affiliated with the appropriate classification is predicted at greater than 90% confidence.

In another exemplary aspect, processing may also include processing the text of a governance policy related to identified data with NLP (natural language processing) since governance policies may be written in free text format. The governance policy may be processed using NLP and parsed to look for specific word patterns that represent data collected, declared usage, sharing policies, etc. For example, governance policy document passages such as "Data Usage," may be traversed to identify how an employee is able to use the data. Other passages, such as "Data Sharing," may be traversed to identify with whom the data may be shared. An exemplary sharing policy may be processed to learn that associated data may be shared with other employees of the organization but not with third party contractors of the organization.

At step 120, nodes and edges in the graph may be generated using information extracted from a governance policy and user interactions with identified data across the usage lifecycle. This may include using ML generative models or more traditional methods. These ML approaches may include Variational Autoencoder (VAE), auto-regressive models and other approaches to generate graphs with a similar structure. Where traditional methods are used to generate the graph, ML may be used to predict nodes and edges based on incomplete data. Although the generation of the data graph to identify relationships and the identification of what information may be shared are described as occurring concurrently, or substantially concurrently, it should be recognized that these processes may occur separately. In addition, different and multiple data sources may be used to generate the graph. In addition, updates to the graph and/or the information shared may occur concurrently, or the updates may occur separately.

In accordance with aspects, a node in a graph or GNN may be created and associated with an entity (e.g., an employee, database, dataset, supplier, etc.). Additionally, a temporary node may be created for each of the ambiguous sharing elements and for each of the data elements collected. For example, if the entity name is "Dataset XYZ" then a node is created for Dataset XYZ. Temporary nodes may be created for elements such as "Employee Usage" and other ambiguous phrases. Edges may be created between Dataset and each temporary node for each of the sensitive data elements like Age/Birth Date, etc.

For example, for implied nodes from shared identifiers/keys for which there may not be any company information, ML may be used to collapse these temporary nodes to real entities if inferred similarities are found.

At step 125, ambiguous nodes (e.g., nodes that are not assigned to a specific entity) may be resolved into specific nodes as possible. In some cases, names for the ambiguous nodes may be found in the governance policy. In other aspects, other data sources may be reviewed for this information. Examples of other sources may include legal documents such as contracts with external data providers.

Each ambiguous node may resolve into zero, one, or more entity names. In the case where no data are found the ambiguous node is left ambiguous. In the case where one or more entity names are found, a node may be created for each discovered entity, and the edges that are connected to the ambiguous node may be replicated to the new entity node.

In a pre-existing graph or network, the new entity node may already exist. Thus, the edges connected to the ambiguous node may be replicated to connect to the existing company node. This process may be repeated for each new entity discovered and for each ambiguous node.

At step 130, the graph or network may be refined as necessary and/or desired. For example, as contracts/documents are discovered or input into the system describing a relationship between two entities, or where the original governance policy describes additional data restrictions placed on external data, these may be reflected in rules associated with an edge to node connection. For example, if a governance policy or other contract details that a data element (e.g., e-mail address) can be used with an application developed by the firm but the firm is only permitted to use the e-mail address for specific purposes, this knowledge may be associated with the e-mail address sharing edge connection to the external data provider entity node.

In accordance with aspects, if no contractual information is found related to the governance policy then it may be assumed that data may be permitted to propagate unrestricted through the graph or network.

At step 135, when a new entity node is added to the graph or network, the process may recursively iterate for that new entity. For example, the governance policy for the new entity is retrieved and parsed, new ambiguous nodes are created and resolved and new companies are added.

Cycles may be prevented by not allowing creation of "back" links. For example, sharing agreements may be bi-directional. Further, a first party may also be a third party. Infinite loops may be prevented by eliminating the possibility of a cycle, by limiting the number of times a particular node is traversed, etc. For example, loop prevention may be used. Cycles can be prevented using well-known cycle detection logic. In addition, cycles may be allowed in the data structure but prevented in processing and traversal.

At step 140, data probes may be inserted into to an entity in the graph or network, and then the propagation of the data in the data probe may be monitored. For example, the graph or network may be validated or modified by inserting a data probe of synthetic data, or by monitoring real data, as it propagates through the graph or network. For example, the type of data, timing, etc., may be monitored. As the data propagates to different entities, the graph or network may be verified or modified, and edges may be removed or added as necessary. In addition, nodes may also be added as is necessary and/or desired. This step may be performed while the graph or network is being created, or whenever it is necessary and/or desired.

At step 145, artificial intelligence and/or machine learning may be used to modify and/or enhance the graph or network. For example, GML (graph machine learning) may be used as is necessary and/or desired. Instead of working on static data, these learning networks may work with dynamic changing information including significant changes in the graphs in each layer.

At step 150, ML is used to predict the flow of data in a network using discriminative models to predict the edge probabilities. Types of discriminative models may include: GNNs, bipartite graphs using scoring functions, recurrent neural networks (RNNs), and heuristics. ML may be used to predict the flow of the data held by a firm through the graph or network. For example, based on the data probes, the entities that may receive the data may be identified.

At step 155, actions may be taken using the graph or network. These actions may include creating insights and recommendations using ML and delivering those to the user so they may make better decisions. For example, automated messages may be sent to employees that are likely to receive a consumer's data requesting they delete the data when their work task is completed. In one example, nodes that are particularly active in sharing data may be targeted initially, and then less active nodes may follow. The requests may be sent preemptively, that is, before data may be shared with the entity.

In accordance with aspects, the graph or network may also be used to identify a source of data. This data source can then be connected to the appropriate governance policies. For example, a certain source can determine a sensitivity label. For instance, data with a source of "credit card transactions" could all be marked with a warned sensitivity level related to those transactions.

The graph or network may be used to identify any differences between what the governance policy specifies and what the employee is requesting and what they have used in the past. If the entity is taking or sharing data that is outside the permissions of the governance policy (i.e., unauthorized), the user may be notified, or the request may be denied and access blocked.

In accordance with aspects, various processes may be used to optimize the processing of this system. The processors and/or the databases can be physically located in different geographical locations, which allows optimization of the processing load. That is, processing servers may be located in geographically distinct locations and connected so as to communicate in any suitable manner. Additionally, the processors and/or the databases may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

Ultimately, it is not necessary that a human user actually interacts with a user interface used by the processing machine described here. Rather, the user interface might interact, i.e., convey and receive information, with another processing machine, rather than a human user. Further, a user interface utilized in the system may interact partially with another processing machine or processing machines, while also interacting partially with a human user. The eventual goal is a zero-touch system.

Figure 2:
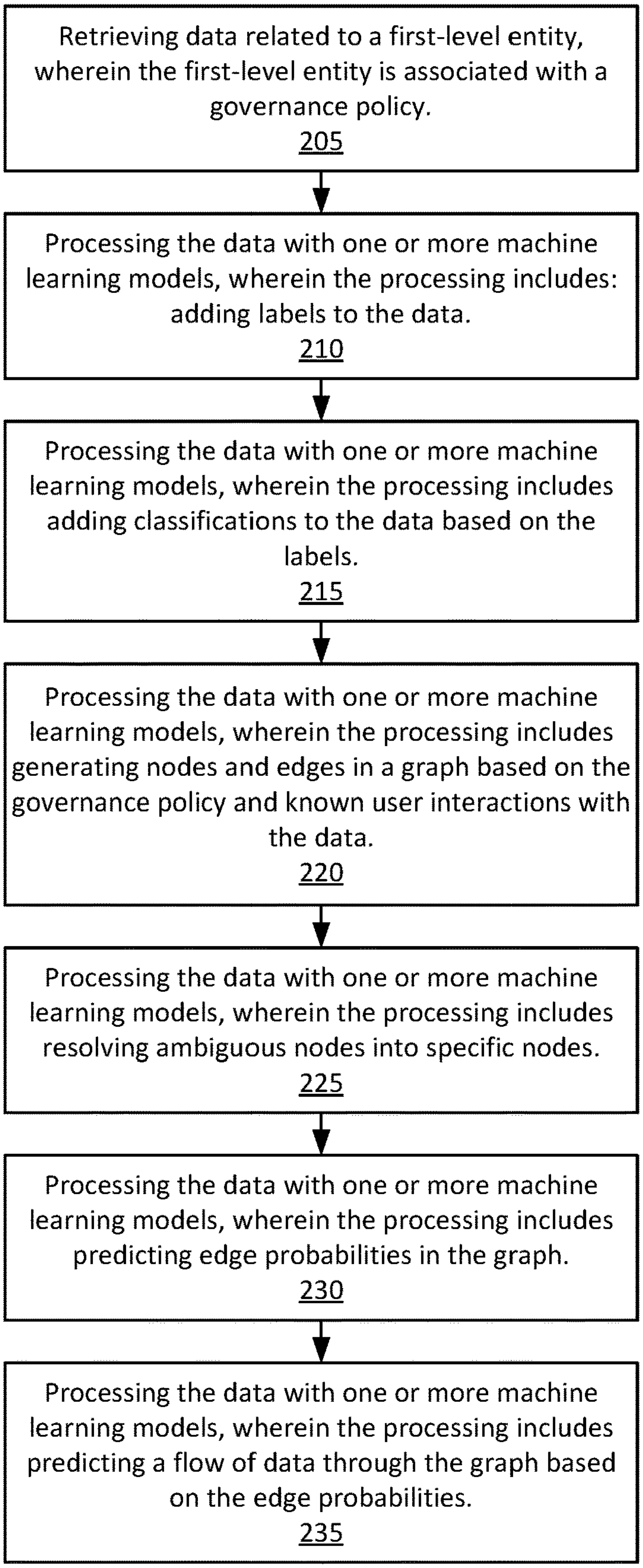
FIG. 2 is a logical flow for data classification and governance, in accordance with aspects.

FIG. 2 is a logical flow for data classification and governance, in accordance with aspects.

Step 205 includes retrieving data related to a first-level entity, wherein the first-level entity is associated with a governance policy.

Step 210 includes processing the data with one or more machine learning models, wherein the processing includes adding labels to the data, Step 215 includes processing the data with one or more machine learning models, wherein the processing includes adding classifications to the data based on the labels.

Step 220 incudes processing the data with one or more machine learning models, wherein the processing includes generating nodes and edges in a graph based on the governance policy and known user interactions with the data.

Step 225 includes processing the data with one or more machine learning models, wherein the processing includes resolving ambiguous nodes into specific nodes.

Step 230 includes processing the data with one or more machine learning models, wherein the processing includes predicting edge probabilities in the graph.

Step 235 includes processing the data with one or more machine learning models, wherein the processing includes predicting a flow of data through the graph based on the edge probabilities.

Figure 3:
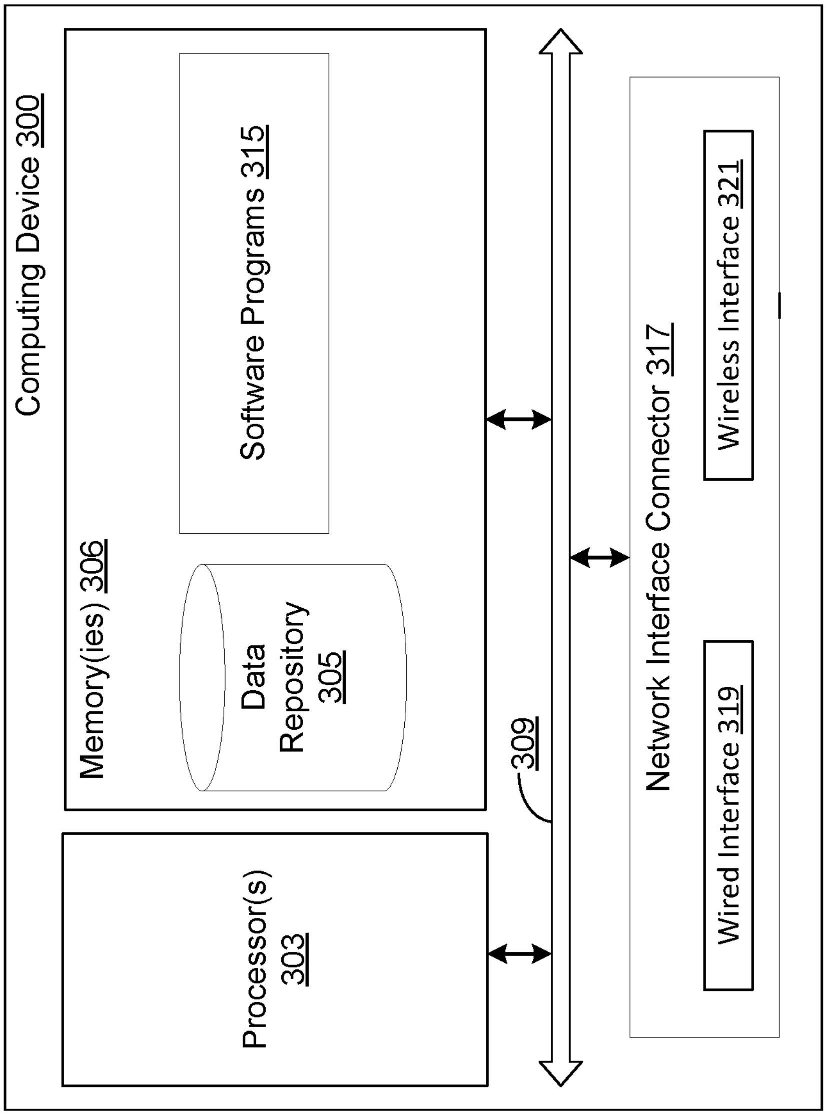
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such as a ML model engine that executes the various ML models described herein, various database engines and database servers that may house and serve first-level entity data, end-user computers and devices, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a “processing machine” a “computing device,” an “electronic device,” a “mobile device,” etc. These may be a general-purpose computer, a computer server, a host machine, etc. As used herein, the term “processing machine,” “computing device, “electronic device,” or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion.

Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method for data classification and governance, comprising:

retrieving data related to a first-level entity, wherein the first-level entity comprises at least one or more of an internal database, a stored dataset, and an internal platform, wherein the retrieved data includes internal user-activity data for the first-level entity including one or more of an employee query, an access report, an internal monitoring information, a download report, and a human resources (HR) employee hierarchy, and wherein the first-level entity is associated with a governance policy that is stored centrally within an organization and is programmatically accessed, wherein the governance policy is associated with one or more of: a data source, a storage location, a logical dataset, the HR employee hierarchy, and a line of business;

processing the data with one or more machine learning models, wherein the processing includes:

adding labels to the data;

adding classifications to the data based on the labels;

generating nodes and edges in a graph based on the governance policy and known user interactions with the data across a usage lifecycle, wherein the nodes represent entities including databases, employees, and managers, and wherein the edges represent data sharing relationships, wherein the graph is dynamically updated based on real-time data inputs, monitored changes in governance policies, and includes a hierarchical structure that prioritizes sensitive data flows based on organizational roles and permissions, and further comprising a mechanism to enforce data retention policies based on predefined organizational rules stored in the governance policy, wherein the hierarchical structure is dynamically adjusted based on sensitivity scores assigned to data flows;

resolving ambiguous nodes into specific nodes;

predicting edge probabilities in the graph;

predicting a flow of data through the graph based on the edge probabilities;

processing and parsing a text of the governance policy related to identified data with natural language processing ("NLP"), wherein the governance policy is written in free text format, wherein the parsing identifies one or more specific word patterns that represent one or more of collected data, a declared usage, and a sharing policy;

inserting a data probe at an entity in the graph;

identifying, based on the data probes, the entities that receive the data;

monitoring the injected data from the data probe into the graph as the injected data traverses the graph, wherein the monitoring includes tracking data flow anomalies and identifying unauthorized data sharing events;

generating automated messages to one or more employees that are likely to receive the data based on the entity identification that request the one or more employees delete the data when an employee work task is completed, wherein the automated messages are sent preemptively before the data may be shared with the one or more employees;

sending the requests preemptively, that is, before the data may be shared with the entity;

identifying any differences between what the governance policy specifies and what the one or more employee are requesting and what they have used in a past; and when the one of the one or more employees is requesting or sharing the data that is outside the permissions of the governance policy, denying the request and blocking access to the data based on the governance policy.

2. The method of claim 1, wherein the graph is refined with new edge-to-node connections based on discovered relationships.

3. The method of claim 1, comprising:

updating the graph based on a traverse path of the injected data.

4. The method of claim 3, wherein the updating includes adding edges to the graph.

5. The method of claim 3, wherein the updating includes adding nodes to the graph.

6. The method of claim 1, comprising:

generating an action with respect to an end user based on the flow of data through the graph.

7. A system for data classification and governance comprising at least one computer including a processor, wherein the processor is configured to:

retrieve data related to a first-level entity, wherein the first-level entity comprises at least one or more of an internal database, a stored dataset, and an internal platform, wherein the retrieved data includes internal user-activity data for the first-level entity including one or more of an employee query, an access report, an internal monitoring information, a download report, and a human resources (HR) employee hierarchy, and wherein the first-level entity is associated with a governance policy that is stored centrally within an organization and is programmatically accessed, wherein the governance policy is associated with one or more of: a data source, a storage location, a logical dataset, the HR employee hierarchy, and a line of business;

process the data with one or more machine learning models, wherein the one or more machine learning models are configured to:

add labels to the data;

add classifications to the data based on the labels;

generate nodes and edges in a graph based on the governance policy and known user interactions with the data across a usage lifecycle, wherein the nodes represent entities including databases, employees, and managers, and wherein the edges represent data sharing relationships, wherein the graph is dynamically updated based on real-time data inputs, monitored changes in governance policies, and includes a hierarchical structure that prioritizes sensitive data flows based on organizational roles and permissions, and further comprising a mechanism to enforce data retention policies based on predefined organizational rules stored in the governance policy, wherein the hierarchical structure is dynamically adjusted based on sensitivity scores assigned to data flows;

resolve ambiguous nodes into specific nodes;

predict edge probabilities in the graph;

predict a flow of data through the graph based on the edge probabilities;

process and parse a text of the governance policy related to identified data with natural language processing ("NLP"), wherein the governance policy is written in free text format, wherein the parsing identifies one or more specific word patterns that represent one or more of collected data, a declared usage, and a sharing policy;

insert a data probe at an entity in the graph;

identify, based on the data probes, the entities that receive the data;

monitor injected data from the data probe into the graph as the injected data traverses the graph, wherein the monitoring includes tracking data flow anomalies and identifying unauthorized data sharing events;

generate automated messages to one or more employees that are likely to receive the data based on the entity identification that request the one or more employees delete the data when an employee work task is completed, wherein the automated messages are sent preemptively before the data may be shared with the one or more employees;

sending the requests preemptively, that is, before the data may be shared with the entity;

identify any differences between what the governance policy specifies and what the one or more employee are requesting and what they have used in a past; and when the one of the one or more employees is requesting or sharing the data that is outside the permissions of the governance policy, denying the request and blocking access to the data based on the governance policy.

8. The system of claim 7, wherein the graph is refined with new edge-to-node connections based on discovered relationships.

9. The system of claim 7, wherein the processor is configured to:

update the graph based on a traverse path of the injected data.

10. The system of claim 9, wherein the update includes adding edges to the graph.

11. The system of claim 9, wherein the update includes adding nodes to the graph.

12. The system of claim 7, wherein the processor is configured to:

generate an action with respect to an end user based on the flow of data through the graph.

13. A non-transitory computer readable storage medium, including instructions stored thereon for data classification and governance, which instructions, when read and executed by one or more computer processors, cause the one or more computer processors to perform steps comprising:

retrieving data related to a first-level entity, wherein the first-level entity comprises at least one or more of an internal database, a stored dataset, and an internal platform, wherein the retrieved data includes internal user-activity data for the first-level entity including one or more of an employee query, an access report, an internal monitoring information, a download report, and a human resources (HR) employee hierarchy, and wherein the first-level entity is associated with a governance policy that is stored centrally within an organization and is programmatically accessed, wherein the governance policy is associated with one or more of: a data source, a storage location, a logical dataset, the HR employee hierarchy, and a line of business;

processing the data with one or more machine learning models, wherein the processing includes:

adding labels to the data;

adding classifications to the data based on the labels;

generating nodes and edges in a graph based on the governance policy and known user interactions with the data across a usage lifecycle, wherein the nodes represent entities including databases, employees, and managers, and wherein the edges represent data sharing relationships, wherein the graph is dynamically updated based on real-time data inputs, monitored changes in governance policies, and includes a hierarchical structure that prioritizes sensitive data flows based on organizational roles and permissions, and further comprising a mechanism to enforce data retention policies based on predefined organizational rules stored in the governance policy, wherein the hierarchical structure is dynamically adjusted based on sensitivity scores assigned to data flows;

resolving ambiguous nodes into specific nodes;

predicting edge probabilities in the graph;

predicting a flow of data through the graph based on the edge probabilities;

processing and parsing a text of the governance policy related to identified data with natural language processing ("NLP"), wherein the governance policy is written in free text format, wherein the parsing identifies one or more specific word patterns that represent one or more of collected data, a declared usage, and a sharing policy;

inserting a data probe at an entity in the graph;

identifying, based on the data probes, the entities that receive the data;

monitoring injected data from the data probe into the graph as the injected data traverses the graph, wherein the monitoring includes tracking data flow anomalies and identifying unauthorized data sharing events;

generating automated messages to one or more employees that are likely to receive the data based on the entity identification that request the one or more employees delete the data when an employee work task is completed, wherein the automated messages are sent preemptively before the data may be shared with the one or more employees;

sending the requests preemptively, that is, before the data may be shared with the entity;

identifying any differences between what the governance policy specifies and what the one or more employee are requesting and what they have used in a past; and when the one of the one or more employees is requesting or sharing the data that is outside the permissions of the governance policy, denying the request and blocking access to the data based on the governance policy.

14. The non-transitory computer readable storage medium of claim 13, wherein the graph is refined with new edge-to-node connections based on discovered relationships.

15. The non-transitory computer readable storage medium of claim 13, comprising:

updating the graph based on a traverse path of the injected data.

16. The non-transitory computer readable storage medium of claim 15, wherein the updating includes adding edges to the graph and adding nodes to the graph.

17. The non-transitory computer readable storage medium of claim 13, comprising:

generating an action with respect to an end user based on the flow of data through the graph.

* * * * *